United States Patent
Sunagawa et al.

(10) Patent No.: US 6,812,264 B2
(45) Date of Patent: Nov. 2, 2004

(54) FOAMABLE POLYESTER RESIN COMPOSITION

(75) Inventors: Takenobu Sunagawa, Osaka (JP); Mamoru Kadokura, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/380,390

(22) PCT Filed: Jul. 10, 2002

(86) PCT No.: PCT/JP02/07025
§ 371 (c)(1),
(2), (4) Date: Mar. 10, 2003

(87) PCT Pub. No.: WO03/006539
PCT Pub. Date: Jan. 23, 2003

(65) Prior Publication Data
US 2003/0187127 A1 Oct. 2, 2003

(30) Foreign Application Priority Data

Jul. 11, 2001 (JP) ........................ 2001-210694
Sep. 19, 2001 (JP) ........................ 2001-285624

(51) Int. Cl.⁷ .................................................. C08J 9/00
(52) U.S. Cl. ........................................ 521/138; 521/139
(58) Field of Search ........................ 521/138; 523/201; 525/64

(56) References Cited

U.S. PATENT DOCUMENTS 4,587,272 A * 5/1986 Avakian et al.
5,310,799 A * 5/1994 Carson et al.

FOREIGN PATENT DOCUMENTS

| JP | 50-44261 A | 4/1975 |
| JP | 8-311230 A | 11/1996 |
| JP | 2001-181428 A | 3/2001 |
| JP | 2001-302833 A | 10/2001 |

OTHER PUBLICATIONS

International Search Report Corresponding to International Application No. PCT/JP02/07025 From the Japanese Patent Office Dated Oct. 15, 2002.

* cited by examiner

*Primary Examiner*—Morton Foelak
(74) *Attorney, Agent, or Firm*—Brinks Hofer Gilson & Lione

(57) ABSTRACT

A foamable polyester resin composition comprising (A) 100 parts by weight of a polyester resin, (B) from 0.5 to 30 parts by weight of a (meth)acrylic ester polymer or a polymer mixture obtained by polymerizing from 0 to 50 parts by weight of a monomer mixture (b) in the presence of a polymer latex which is obtained by emulsion-polymerizing from 50 to 100 parts by weight of a monomer mixture (a) wherein, when 0.1 g of the polymer is dissolved in 100 mL of chloroform, the resulting solution has a specific viscosity of from 0.7 to 1.9 as measured at 30° C. (wherein the sum of the monomer mixtures (a) and (b) being 100 parts by weight), wherein, when 0.1 g of the (meth)acrylic ester polymer or the polymer mixture is dissolved in 100 mL of chloroform, the resulting solution has a specific viscosity of from 0.65 to 1.7 as measured at 30° C., (C) from 0.1 to 30 parts by weight of a filler, (D) a blowing agent.

7 Claims, No Drawings

FOAMABLE POLYESTER RESIN COMPOSITION

RELATED APPLICATIONS

This application is a nationalization of PCT Application No. PCT/JP02/07025 filed Jul. 10, 2002, and not published in English. This application claims priority from the PCT application; Japanese Application Serial No. 2001-210694 filed Jul. 11, 2001; and Japanese Application Serial No. 2001-285624 filed Sep. 19, 2001.

FIELD OF THE INVENTION

The present invention relates to a foamable polyester resin composition. More particularly, the invention relates to a foamable polyester resin composition which has excellent low-temperature processability and gives a highly expanded foamed molding excellent in strength and surface properties.

BACKGROUND ART

Polyester resins give moldings excellent in physical properties such as transparency, mechanical properties, gas barrier properties, and heat resistance and in chemical properties such as solvent resistance, acid resistance, and alkali resistance, and are hence extensively used as packaging materials, e.g., bottles, sheets, and films and in other various fields. Recently, foam molding is attracting attention as a technique for reducing the weight of polyester resins, improving the heat-insulating properties of the resins, and reducing the cost of moldings. There is a strong desire in the market for a highly expanded polyester resin molding.

In a generally known technique for the foam molding of a polyester resin, a chain-branching agent is used in combination with a blowing agent.

It is known that use of, for example, a carboxylic acid dianhydride as the chain-branching agent is effective in heightening the molecular weight of a molten polyester resin or improving the melt viscosity thereof and thereby enabling foam molding to be conducted in a high expansion ratio.

For example, Japanese Patents 1,921,348 and 2,126,744 disclose that a foamed molding having an improved expansion ratio can be obtained by adding a compound having two or more acid anhydride groups in the molecule, such as pyromellitic dianhydride, as a chain-branching agent to the polyester resin to be foamed.

However, since pyromellitic dianhydride has a melting point as high as 280° C., it produces its effect only when the resin is heated and molded at a temperature of from 270 to 290° C. When the molding was actually conducted in a low-temperature range of up to 210° C., almost no effect was observed.

The present invention is intended to attain a high expansion ratio even when foam molding is conducted in a low-temperature range of from 150 to 210° C., by using a (meth)acrylic ester polymer without using any of those chain-branching agents. The invention hence differs from the technique described above.

Furthermore, Japanese Patent Laid-Open No. 2000-136301 discloses that a foamed molding having an expansion ratio of from 1.6 to 3.0 is obtained from a composition prepared by adding an acrylic resin to an alloyed resin which is a blend of a polycarbonate with another aromatic-ring-containing thermoplastic resin containing a polyester resin.

The invention enables a further improvement in expansibility by using a (meth)acrylic ester polymer having a specific value of specific viscosity produced by (co)polymerizing one or more monomer mixtures having a specific composition. Furthermore, the invention mitigates the decrease in strength in foamed moldings attributable to an increase in expansion ratio, by adding a filler. The invention hence differs from the technique of the related art described above.

DISCLOSURE OF THE INVENTION

An object of the invention is to provide a foamable polyester resin composition which can be foam-molded in a greatly improved expansion ratio as compared with foamable polyester resins according to the related art and can give a foamed molding in which the deterioration in strength and surface properties attributable to an increase in expansion ratio has been mitigated.

As a result of intensive investigations, the present inventors have found that a composition which can be foam-molded in a greatly improved expansion ratio and give a foamed molding improved in strength and surface properties can be obtained by adding a specific (meth)acrylic ester polymer, a filler, and a blowing agent to a polyester resin. The invention has been completed based on this finding.

The invention relates the following composition:
(1) A foamable polyester resin composition comprising;
   (A) 100 parts by weight of a polyester resin;
   (B) from 0.5 to 30 parts by weight of a (meth)acrylic ester polymer or a polymer mixture obtained by polymerizing from 0 to 50 parts by weight of a monomer mixture (b) comprising from 0 to 49% by weight methyl methacrylate, from 51 to 100% by weight at least one monomer selected from methacrylic esters other than methyl methacrylate and acrylic esters, and from 0 to 20% by weight at least one vinyl monomer copolymerizable therewith, in the presence of a polymer latex which is obtained by emulsion-polymerizing from 50 to 100 parts by weight of a monomer mixture (a) comprising from 51 to 100% by weight methyl methacrylate, from 0 to 49% by weight at least one monomer selected from methacrylic esters other than methyl methacrylate and acrylic esters, and from 0 to 20% by weight at least one vinyl monomer copolymerizable therewith wherein, when 0.1 g of the polymer is dissolved in 100 mL of chloroform, the resulting solution has a specific viscosity of from 0.7 to 1.9 as measured at 30° C. (wherein the sum of the monomer mixtures (a) and (b) being 100 parts by weight),
   wherein, when 0.1 g of the (meth)acrylic ester polymer or the polymer mixture is dissolved in 100 mL of chloroform, the resulting solution has a specific viscosity of from 0.65 to 1.7 as measured at 30° C.;
   (C) from 0.1 to 30 parts by weight of a filler; and
   (D) a blowing agent.
(2) The foamable polyester resin composition according to (1), wherein the polyester resin (A) is an amorphous polyester resin.
(3) The foamable polyester resin composition according to (1) or (2), wherein the filler (C) is talc, calcium carbonate, mica, wollastonite, clay, or glass fiber.
(4) The foamable polyester resin composition according to any one of (1), (2) and (3), wherein the blowing agent (D) is a thermal-decomposable blowing agent and is contained in an amount of from 0.1 to 25 parts by weight per 100 parts by weight the polyester resin.
(5) A foamed molding obtained by molding the foamable polyester resin composition according to (1).

Best Mode for Carrying Out the Invention

A feature of the invention resides in that a polymer or polymer mixture obtained by emulsion-polymerizing a specific monomer or monomer mixture comprising a significant amount of one or more methacrylic esters and (or) acrylic esters is used for the purpose of improving the expansibility of a polyester resin. Use of the (meth)acrylic ester polymer or polymer mixture in combination with a blowing agent and a filler is effective in improving the expansion ratio of the polyester resin in foam molding without impairing the excellent physical and chemical properties inherent in the polyester resin.

The polyester resin to be used in the invention is a thermoplastic polyester resin obtained by mixing one or more aromatic dicarboxylic acids with one or more dihydric alcohols, i.e., diols, and causing these ingredients to undergo an esterification reaction and polycondensation. As the dicarboxylic acids may be used ones comprising terephthalic acid or an alkyl ester thereof as the main component. As the diols may be used ones comprising an alkylene glycol as the main component.

The polyester resin to be used in the invention is not particularly limited. Although any of the polyester resins heretofore in use or polyester resins recycled may be used, it is preferred to use an amorphous polyester resin from the standpoint of ease of processing. This amorphous polyester resin is one which has substantially no crystallinity or is lowly crystalline. Examples thereof include homopolymers and copolymers obtained by condensation-polymerizing a diol ingredient comprising at least 50 mol % ethylene glycol with a dicarboxylic acid ingredient comprising at least 50 mol % terephthalic acid or alkyl ester thereof, and further include mixtures of two or more of these homo- and copolymers. Examples of the copolymers include ones obtained by copolymerizing another dicarboxylic acid, e.g., isophthalic acid or a halogenated terephthalic acid, in an amount of up to 50 mol % based on all carboxylic acids, ones obtained by copolymerizing a polyalkylene glycol, e.g., diethylene glycol, in an amount of up to 50 mol % based on all diols, and ones obtained by copolymerizing an alkylene glycol in which the alkylene group has 3 to 12 carbon atoms, e.g., 1,4-cyclohexanedimethanol.

The (meth)acrylic ester polymer or polymer mixture to be used in the invention is a polymer or polymer mixture obtained by emulsion-polymerizing a monomer mixture (a) to obtain a polymer latex, adding a monomer mixture (b) to the latex, and polymerizing the monomer mixture (b) in the presence of the latex. This polymer or polymer mixture is an ingredient used for the purpose of improving the expansibility of the polyester resin.

The monomer mixture (a) is a mixture comprising: from 50 to 100% (% by weight; the same applies hereinafter), preferably from 51 to 100%, more preferably from 60 to 90%, most preferably from 70 to 85% methyl methacrylate; from 0 to 50%, preferably from 0 to 49% more preferably from 0 to 40%, most preferably from 0 to 30% at least one monomer selected from methacrylic esters other than methyl methacrylate and acrylic esters; and from 0 to 20%, preferably from 0 to 10%, more preferably from 0 to 5% at least one vinyl monomer copolymerizable with these.

When the proportion of methyl methacrylate in the monomer mixture (a) is lower than 50%, use of the resultant polymer or polymer mixture gives a composition reduced in expansibility and processability. When the proportion of the monomer selected from methacrylic esters other than methyl methacrylate and acrylic esters exceeds 50%, use of the resultant polymer or polymer mixture gives a composition reduced in expansibility and processability. Furthermore, When the proportion of the vinyl monomer copolymerizable with those monomers exceeds 20%, use of the resultant polymer or polymer mixture gives a composition reduced in expansibility and processability.

Examples of the methacrylic esters other than methyl methacrylate in the monomer mixture (a) include alkyl methacrylates in which the alkyl group has 2 to 8 carbon atoms, such as ethyl methacrylate, propyl methacrylate, butyl methacrylate, and 2-ethylhexyl methacrylate. Examples of the acrylic esters include alkyl acrylates in which the alkyl group has 1 to 8 carbon atoms, such as methyl acrylate, ethyl acrylate, propyl acrylate, butyl acrylate, and 2-ethylhexyl acrylate. These methacrylic esters other than methyl methacrylate and acrylic esters may be used alone or in combination of two or more thereof.

Examples of the vinyl monomer copolymerizable with those monomers in the monomer mixture (a) include aromatic vinyls such as styrene and α-methylstyrene and unsaturated nitriles such as acrylonitrile. These may be used alone or in combination of two or more thereof.

The polymer obtained by emulsion-polymerizing the monomer mixture (a), when dissolved in an amount of 0.1 g in 100 mL of chloroform, gives a solution having a specific viscosity as measured at 30° C. of from 0.7 to 1.9, preferably from 0.8 to 1.8, more preferably from 0.8 to 1.7, most preferably from 0.9 to 1.6. When the specific viscosity thereof exceeds 1.9, the composition finally obtained tends to have reduced expansibility and reduced processability. When the specific viscosity thereof is lower than 0.7, the composition tends to have reduced expansibility and give a foamed molding having impaired surface properties.

The monomer mixture (b) comprises: from 0 to 49%, preferably from 20 to 49%, more preferably from 30 to 45% methyl methacrylate; from 51 to 100%, preferably from 51 to 80%, more preferably from 55 to 70% at least one monomer selected from methacrylic esters other than methyl methacrylate and acrylic esters; and from 0 to 20%, preferably from 0 to 10%, more preferably from 0 to 5% at least one vinyl monomer copolymerizable with these.

The monomer mixture (b) is polymerized in the presence of a latex of a polymer obtained by polymerizing the monomer mixture (a) to thereby form a shell made of a polymer obtained by polymerizing the mixture (b). Thus, the (meth)acrylic ester polymer or polymer mixture is obtained. This polymer or polymer mixture, when added to a polyester resin, can efficiently impart viscosity and elasticity to the polyester resin and, as a result, can improve the expansibility thereof.

When where the proportion of methyl methacrylate in the monomer mixture (b) exceeds 50%, use of the resultant polymer or polymer mixture is apt to give a composition impaired in expansibility and processability. When the proportion of the at least one monomer selected from methacrylic esters other than methyl methacrylate and acrylic esters is lower than 50%, the same results are brought about. At least one vinyl monomer copolymerizable with these can be used according to need in an amount of up to 20%. However, the smaller the amount of the vinyl monomer, the more the monomer mixture (b) is preferred.

Examples of the methacrylic esters other than methyl methacrylate in the monomer mixture (b) include alkyl methacrylates in which the alkyl group has 2 to 8 carbon atoms, such as ethyl methacrylate, propyl methacrylate, butyl methacrylate, and 2-ethylhexyl methacrylate. Examples of the acrylic esters include alkyl acrylates in which the alkyl group has 1 to 8 carbon atoms, such as methyl acrylate, ethyl acrylate, propyl acrylate, butyl acrylate, and 2-ethylhexyl acrylate. These methacrylic esters other than methyl methacrylate and acrylic esters may be used alone or in combination of two or more thereof.

Examples of the vinyl monomer copolymerizable with those monomers in the monomer mixture (b) include aromatic vinyls such as styrene and α-methylstyrene and unsaturated nitriles such as acrylonitrile. These may be used alone or in combination of two or more thereof.

The polymer or polymer mixture obtained by adding the monomer mixture (b) to a latex of a polymer obtained from the monomer mixture (a) and polymerizing the mixture (b)

in the presence of the latex, when dissolved in an amount of 0.1 g in 100 mL of chloroform, gives a solution having a specific viscosity as measured at 30° C. of from 0.1 to 1.7, preferably from 0.65 to 1.7, more preferably from 0.65 to 1.6, most preferably from 0.7 to 1.5.

When the specific viscosity thereof exceeds 1.7, this polymer or polymer mixture tends to give a composition reduced in expansibility and processability. When the specific viscosity thereof is lower than 0.1, this polymer or polymer mixture tends to give a composition having reduced expansibility and giving a foamed molding having impaired surface properties.

In producing the (meth)acrylic ester polymer or polymer mixture according to the invention, the proportion of the monomer mixture (a) to monomer mixture (b) to be used is such that the amount of the monomer mixture (a) is from 50 to 100 parts (parts by weight; the same applies hereinafter), preferably from 60 to 95 parts, more preferably from 65 to 90 parts, and the amount of the monomer mixture (b) is from 0 to 50 parts, preferably from 5 to 40 parts, more preferably from 10 to 35 parts, provided that the sum of the mixtures (a) and (b) is 100 parts.

When the amount of the polymer formed from the monomer mixture (a) is smaller than about 50 parts, sufficient expansibility cannot be imparted to a polyester resin. On the other hand, when the amount of the polymer formed from the monomer mixture (b) exceeds 50 parts, this case also results in insufficient impartation of expansibility to a polyester resin.

The (meth)acrylic ester polymer or polymer mixture to be used in the invention can be produced, for example, by the following method. First, a monomer mixture (a) is emulsion-polymerized in an appropriate medium in the presence of an appropriate emulsifier, polymerization initiator, chain transfer agent, etc. to obtain a (co)polymer latex in which the polymer is derived from the monomer mixture (a). Subsequently, a monomer mixture (b) is added to the latex and polymerized. By thus polymerizing the mixtures successively, a mixture of products of one-step or two-step polymerization is produced which comprises particles each comprising a core made of a (co)polymer derived from the monomer mixture (a) and a shell made of a (co)polymer derived from the monomer mixture (b). The dispersion medium for use in the emulsion polymerization is usually water.

As the emulsifier is used a known one. Examples thereof include anionic surfactants such as fatty acid salts, alkylsulfuric acid ester salts, alkylbenzenesulfonic acid salts, alkylphosphoric acid ester salts, and sulfosuccinic acid diester salts and nonionic surfactants such as polyoxyethylene alkyl ethers and polyoxyethylene fatty acid esters.

As the polymerization initiator, for example, a water-soluble or oil-soluble polymerization initiator is used. Examples thereof include ordinary inorganic polymerization initiators such as persulfates, organic peroxides, and azo compounds. Although these initiator compounds may be used alone, they may be used in combination with a sulfite, a thiosulfate, a salt of a metal having the lower valence, sodium formaldehydesulfoxylate, or the like so as to constitute a redox system. Preferred examples of the persulfates include sodium persulfate, potassium persulfate, and ammonium persulfate. Preferred examples of the organic peroxides include t-butyl hydroperoxide, cumene hydroperoxide, benzoyl peroxide, and lauroyl peroxide.

The chain transfer agent is not particularly limited. Examples thereof include t-dodecyl mercaptan, n-dodecyl mercaptan, t-decyl mercaptan, and n-decyl mercaptan.

Conditions for the polymerization reaction such as, e.g., temperature and time also are not particularly limited, and may be suitably regulated so as to result in the desired specific viscosity and particle diameter according to the intended use.

When the polymerization is conducted in two steps, the monomer(s) for second-step polymerization may be added after ascertaining that the first-step polymerization has been completed. This method of monomer addition is preferred in that the polymerization in each step can be carried out while preventing the monomers for the second step from mixing with the monomers for the first step.

In the polymer latex thus obtained, the particles usually have an average particle diameter of about from 100 to 3,000 Å. The particles are taken out of the latex by an ordinary technique, e.g., salting out or coagulation by the addition of an electrolyte or drying by spraying into hot air. The particles taken out may be subjected to washing, dehydration, drying, etc. by ordinary techniques according to need.

The (meth)acrylic ester polymer or polymer mixture obtained by the procedure described above generally preferably is in the form of a white powder having an average particle diameter of from 30 to 300 $\mu$m from the standpoint of incorporating the polymer or polymer mixture into a polyester resin.

The (meth)acrylic ester polymer or polymer mixture according to the invention is mixed with a polyester resin in an ordinary manner in producing the foamable polyester resin composition of the invention.

The amount of the (meth)acrylic ester polymer or polymer mixture to be added is from 0.5 to 30 parts, preferably from 3 to 25 parts, more preferably from 5 to 20 parts, per 100 parts of the polyester resin. When the amount of the (meth) acrylic ester polymer or polymer mixture added is smaller than 0.5 parts, the addition of the (meth)acrylic ester polymer or polymer mixture does not produce a sufficient effect. When the amount thereof exceeds 30 parts, the excellent mechanical properties of the polyester resin are impaired.

The blowing agent to be used in the invention is not particularly limited. Examples thereof include physical blowing agents such as inert gases, e.g., nitrogen, carbon dioxide, and helium, saturated hydrocarbons, e.g., propane, butane, pentane, and hexane, and halogenated hydrocarbons such as tetrafluoromethane and fluorocarbons; and thermal decomposition type blowing agents, e.g., inorganic thermal decomposition type blowing agents such as sodium hydrogen carbonate, potassium hydrogen carbonate, ammonium hydrogen carbonate, sodium carbonate, and ammonium carbonate and organic thermal decomposition type blowing agents such as nitroso compounds, e.g., N,N'-dinitrosopentamethylenetetramine and N,N'-dimethyl-N,N'-dinitrosoterephthalamide, azo compounds, e.g., azodicarbonamide, azobisisobutyronitrile, and barium azodicarboxylates, and sulfonyl hydrazide compounds, e.g., benzenesulfonyl hydrazide and toluenesulfonyl hydrazide. However, thermal decomposition type blowing agents are preferred from the standpoints of foaming efficiency and no need of using a foam molding apparatus having an explosion-proof structure.

The inorganic thermal decomposition type blowing agents enumerated above can be used alone or as a mixture of two or more thereof. Among these, Preferred is sodium hydrogen carbonate from the standpoints of foaming efficiency and cost.

The organic thermal decomposition type blowing agents enumerated above can be used alone or as a mixture of two or more thereof. Among these, preferred is azodicarbonamide from the standpoints of foaming efficiency and cost.

The amount of the blowing agent to be added varies depending on purposes, and is not particularly limited. In general, however, the amount thereof is preferably from 0.1 to 25 parts, more preferably from 0.3 to 18 parts, per 100 parts of the polyester resin. When the amount of the blowing agent added is smaller than 0.1 parts, a molding having a sufficiently high expansion ratio is difficult to obtain. When the amount thereof exceeds 25 parts, a foamed molding having uniform cells is difficult to obtain.

The amount of the blowing agent to be added may be varied according to the amount of the (meth)acrylic ester polymer added. For example, when the amount of the (meth)acrylic ester polymer added is 5 parts, 10 parts, or 20 parts per 100 parts of the polyester resin, then the blowing agent is preferably added in an amount of from 0.1 to 5 parts, from 0.5 to 10 parts, or from 1 to 25 parts, respectively.

The foamable polyester resin composition of the invention further contains a filler so as to give a foamed molding having cell uniformity and improved strength.

Examples of the filler to be used in the invention include talc, calcium carbonate, mica, wollastonite, clay, and glass fibers. These fillers can be used alone or as a mixture of two or more thereof. Among these, preferred from the standpoint of strength improvement are talc, mica, wollastonite, and clay.

The amount of the filler to be added is from 0.1 to 30 parts, preferably from 0.5 to 20 parts, more preferably from 3 to 15 parts, per 100 parts of the polyester resin. When the amount of the filler added is smaller than 0.1 part, a foamed molding having uniform cells is not obtained and sufficient strength is difficult to obtain. When the amount thereof exceeds 30 parts, the resultant composition has too high a melt viscosity and this tends to impose a higher load on the molding machine during molding.

Additives other than those described above may be added to the foamable polyester resin composition of the invention according to need. Examples thereof include compatibilizing agents for reducing the load to be imposed on the drive motor of the molding machine in extrusion molding, wetting agents for preventing pellets from separating from a powder, lubricants, impact modifiers, plasticizers, and colorants. Such additives may be used alone or in combination of two or more thereof.

Processes for producing the foamable polyester resin composition of the invention are not particularly limited. For example, the composition can be produced by a process comprising mixing the polyester resin with the (meth)acrylic ester polymer, a thermal decomposition type blowing agent, a filler, and other additives and then melt-kneading the mixture with a melt-kneading machine such as a single- or twin-screw extruder at a temperature suitable for the resin composition.

Methods for molding the foamable polyester resin composition of the invention are not particularly limited, and molding techniques in general use, such as, e.g., extrusion molding, can be applied.

EXAMPLES

The invention will be explained below in more detail by reference to Examples and Comparative Examples. However, the invention should not be construed as being limited to these Examples.

The evaluation methods used in the Examples and Comparative Examples are summarized below.

Determination of Specific Viscosity of (Meth)Acrylic Ester Polymer:

A 0.1 g portion of a polymer sample was dissolved in 100 mL of chloroform, and the viscosity of this solution was measured with a Ubbelohde viscometer kept at a constant temperature in a 30° C. water bath.

Determination of Expansion Ratio:

A powder compound obtained (unfoamed molding of a polyester resin composition) was examined for specific gravity and then molded with CMT-45, manufactured by Cincinnati Milacron Inc. to obtain a platy molding (foamed molding of the polyester resin composition). The specific gravity of this molding was measured. The expansion ratio was calculated from those found values using the following equation.

Expansion ratio=(specific gravity of the unfoamed molding of polyester resin composition)/(specific gravity of the foamed molding of polyester resin composition)

Molding conditions are as follows.
Molding Conditions
Molding temperatures: C1=150° C., C2=155° C., C3=160° C.,
adapter=170° C., die=175° C.
Screw rotational speed: 10 rpm
Discharge rate: 15 kg/hr
Die: 10 mm×180 mm
Determination of Conversion into Polymer:

Conversion into polymer was calculated using the following equation.

Conversion into polymer (%)={(amount of polymer yielded)/(amount of monomers introduced)}×100

Measurement of Average Particle Diameter of Latex:

A (meth)acrylic ester copolymer latex obtained was examined with spectrophotometer U-2000, manufactured by Hitachi, Ltd., using a scattered light having a wavelength of 546 nm to measure the average particle diameter.

Evaluation of Surface Property:

The surface properties of a molding obtained were evaluated based on the following criteria through a visual examination of the appearance thereof.

A: having an excellent appearance with almost no surface recesses and protrusions.
B: having surface recesses and protrusions which are not so conspicuous.
C: having a slightly poor appearance with many surface recesses and protrusions.
D: having a poor appearance with considerable surface recesses and protrusions.

Measurement of Compressive Strength:

Compressive strength at 20% compression was measured at 23° C. in accordance with JIS K7220.

Measurement of Flexural Strength:

Flexural strength was measured at 23° C. in accordance with JIS K7221.

Measurement of Heat Distortion Temperature

Heat distortion temperature (hereinafter referred to as "HDT") was measured under the conditions of a flexural stress of 18.5 kgf/cm$^2$ in accordance with JIS K7207.

Example 1

Into an 8-L reactor equipped with a stirrer was introduced 0.7 parts of dioctyl sodium sulfosuccinate, as an emulsifier, which had been dissolved in water beforehand. Water was added thereto in such an amount that the total water amount including the amount of the water contained in the minor ingredient to be added later became 200 parts. Nitrogen was passed through the gas phase and liquid phase in the reactor to thereby remove the oxygen from the atmosphere and water in the reactor. Thereafter, the contents were heated to 70° C. with stirring. Subsequently, a monomer mixture (a) consisting of 60 parts of methyl methacrylate (hereinafter referred to as MMA) and 20 parts of butyl acrylate (hereinafter referred to as BA) was introduced en bloc into the reactor. Thereto was then added 0.005 parts of potassium persulfate as an initiator. The resultant reaction mixture was continuously stirred for 1 hour to substantially complete the polymerization.

Thereafter, a monomer mixture (b) consisting of 6 parts of MMA and 14 parts of BA was added dropwise to the reaction mixture at a rate of about 30 parts per hour. After completion of the addition, the contents were kept at 70° C. for 90 minutes and then cooled. Thus, a polymer latex was obtained. The average particle diameter thereof was measured. The results obtained are shown in Table 1.

The conversion into polymer in the polymerization process was 99.5%. The polymer latex obtained was coagulated by salting out with an aqueous calcium chloride solution, subsequently heat-treated by heating to 90° C., and then filtered with a centrifugal dehydrator. The dehydrated resin cake obtained was rinsed with almost the same weight of water as the resin and then dried with a parallel-flow drying oven at 50° C. for 15 hours to obtain a polymer sample (1) in a white powder form. The polymer sample (1) obtained was examined for specific viscosity. The results obtained are shown in Table 1.

To 100 parts of a polyester resin (EASTER 6763, manufactured by Eastman Chemical Co.) were added 10 parts of the polymer sample (1), 1.0 part of talc, 5.4 parts of sodium hydrogen carbonate, 0.6 parts of azodicarbonamide, 1.0 part of a compatibilizing agent (Bond Fast BF-7B, manufactured by Sumitomo Chemical Co., Ltd.), and 0.1 part of a wetting agent (Polybudene, manufactured by Koshigaya Kasei Kogyo). This mixture was kneaded with a Henschel mixer to obtain a pellet compound, which was molded with CMT-45, manufactured by Cincinnati Milacron Inc., to obtain a foamed molding. This foamed molding was evaluated for surface properties and examined for expansion ratio. The results obtained are shown in Table 1.

Examples 2 to 7 and Comparative Examples 1 to 3

Using the ingredients shown in Table 1, polymer samples (2) to (10) were obtained in the same manner as in Example 1 according to the respective compositions shown in Table 1. These polymer samples (2) to (10) were examined for the various properties. Furthermore, 10 parts of each of the polymer samples (2) to (10) obtained was incorporated into 100 parts of the polyester resin, and a foamed molding was obtained from the resultant compound in the same manner as in Example 1. The foamed moldings thus obtained respectively in Examples 2 to 7 and Comparative Examples 1 to 3 were evaluated for the various properties. The results obtained are shown in Table 1.

TABLE 1

| Example No. | | | 1 | 2 | 3 | 4 | 5 | 6 | 7 | Comp. Ex. 1 | Comp. Ex. 2 | Comp. Ex. 3 |
|---|---|---|---|---|---|---|---|---|---|---|---|---|
| Polymer sample No. | | | (1) | (2) | (3) | (4) | (5) | (6) | (7) | (8) | (9) | (10) |
| Composition (parts) | Monomer mixture (a) | MMA | 60 | 65 | 65 | 68 | 65 | 70 | 75 | 24 | 32 | 48 |
| | | BMA | — | — | 10 | — | — | — | — | — | — | — |
| | | BA | 20 | 10 | — | — | — | 4 | — | 56 | 48 | — |
| | | EA | — | — | — | 12 | 5 | — | — | — | — | 12 |
| | | AN | — | 5 | — | — | 10 | — | 5 | — | — | — |
| | | St | — | — | 5 | — | — | 6 | — | — | — | 20 |
| | Monomer mixture (b) | MMA | 6 | 6 | 6 | 6 | 6 | 6 | 6 | 6 | 6 | 6 |
| | | BA | 14 | 14 | 14 | 14 | 14 | 14 | 14 | 14 | 14 | 14 |
| Evaluation results | Specific viscosity of core polymer | | 1.11 | 1.13 | 1.12 | 1.12 | 1.11 | 1.11 | 1.06 | 1.11 | 1.12 | 1.03 |
| | Specific viscosity of core/shell polymer mixture | | 0.80 | 0.84 | 0.80 | 0.80 | 0.81 | 0.82 | 0.79 | 0.80 | 0.82 | 0.80 |
| | Average particle diameter of latex (Å) | | 1600 | 1600 | 1500 | 1600 | 1700 | 1500 | 1600 | 1600 | 1600 | 1700 |
| | Expansion ratio | | 5.5 | 5.4 | 5.5 | 5.6 | 5.4 | 5.2 | 4.8 | 2.8 | 2.9 | 2.8 |
| | Surface property | | A | A | A | A | A | A | A | B | B | B |

The results given in Table 1 show the following. When the (meth)acrylic ester polymer samples (1) to (7) were used, compositions having satisfactory expansibility were obtained. However, when the polymer samples (8) to (10), which had been obtained by using as a monomer mixture (a) a mixture containing a monomer selected from methacrylic esters other than methyl methacrylate and acrylic esters in a higher proportion or containing a vinyl monomer copolymerizable with these in a higher proportion than the upper limit specified in the invention, were used, then sufficient expansibility was not obtained.

Examples 8 to 12 and Comparative Examples 4 to 6

Polymer samples (11) to (18) were obtained in the same manner as in Example 1 according to the compositions shown in Table 2. The polymer samples obtained were subjected to the evaluations. The results obtained are shown in Table 2.

TABLE 2

| Example No. | | | 8 | 9 | 10 | 11 | 12 | Comp. Ex. 4 | Comp. Ex. 5 | Comp. Ex. 6 |
|---|---|---|---|---|---|---|---|---|---|---|
| Polymer sample No. | | | (11) | (12) | (13) | (14) | (15) | (16) | (17) | (18) |
| Composition (parts) | Monomer mixture (a) | MMA | 68 | 68 | 68 | 68 | 68 | 68 | 68 | 68 |
| | | BA | 12 | 12 | 12 | 12 | 12 | 12 | 12 | 12 |
| | Monomer mixture (b) | MMA | 8 | 8 | 5 | 5 | 2 | 16 | 18 | 12 |
| | | BMA | 2 | 2 | — | — | — | 4 | 2 | — |
| | | BA | 10 | 8 | 13 | 13 | 15 | — | — | — |
| | | EA | — | 2 | — | — | 3 | — | — | — |
| | | AN | — | — | 2 | — | — | — | — | 3 |
| | | St | — | — | — | 2 | — | — | — | 5 |
| Evaluation results | Specific viscosity of core polymer | | 1.12 | 1.12 | 1.13 | 1.13 | 1.07 | 1.12 | 1.13 | 1.09 |
| | Specific viscosity of core/shell polymer mixture | | 0.84 | 0.82 | 0.83 | 0.85 | 0.78 | 0.80 | 0.82 | 0.78 |
| | Average particle diameter of latex (Å) | | 1600 | 1600 | 1600 | 1600 | 1500 | 1600 | 1600 | 1600 |
| | Expansion ratio | | 5.5 | 5.4 | 5.5 | 5.6 | 5.2 | 2.8 | 2.8 | 2.6 |
| | Surface property | | A | A | A | A | A | B | B | B |

The results given in Table 2 show the following. The polymer samples (11) to (15), for which a monomer mixture (b) having a composition within the range specified in the invention had been used, gave compositions having satisfactory expansibility. In contrast, the polymer samples (16) to (18), for which a monomer mixture having a composition outside the range for the monomer mixture (b) according to the invention had been used as a monomer mixture (b), gave compositions having reduced expansibility.

Examples 13 to 17 and Comparative Examples 7 and 8

Polymer samples (19) to (25) were obtained in the same manner as in Example 1 according to the compositions shown in Table 3.

The polymer samples obtained were subjected to the evaluations. The results obtained are shown in Table 3.

The results given in Table 3 show the following. The polymer samples (19) to (23), for which a monomer mixture (a) had been used in an amount within the range specified in the invention, gave compositions having satisfactory expansibility. In contrast, the polymer samples (24) and (25), for which a monomer mixture (a) had been used in an amount smaller than the lower limit specified in the invention, gave compositions having insufficient expansibility.

Examples 18 to 22, 22a and Comparative Examples 9 and 10

Polymer samples (26) to (32) and (30a) were obtained in the same manner as in Example 1 according to the compositions shown in Table 4.

The polymer samples obtained were subjected to the evaluations. The results obtained are shown in Table 4.

TABLE 3

| Example No. | | | 13 | 14 | 15 | 16 | 17 | Comp. Ex. 7 | Comp. Ex. 8 |
|---|---|---|---|---|---|---|---|---|---|
| Polymer sample No. | | | (19) | (20) | (21) | (22) | (23) | (24) | (25) |
| Composition (parts) | Monomer mixture (a) | MMA | 51 | 60 | 68 | 77 | 83 | 32 | 24 |
| | | BA | 9 | 10 | 12 | 13 | 17 | 8 | 6 |
| | Monomer mixture (b) | MMA | 12 | 9 | 6 | 3 | 0 | 18 | 21 |
| | | BA | 28 | 21 | 14 | 7 | 0 | 42 | 49 |
| Evaluation results | Specific viscosity of core polymer | | 1.23 | 1.18 | 1.12 | 1.06 | 0.79 | 1.35 | 1.42 |
| | Specific viscosity of core/shell polymer mixture | | 0.80 | 0.79 | 0.84 | 0.82 | 0.79 | 0.80 | 0.82 |
| | Average particle diameter of latex (Å) | | 1500 | 1500 | 1600 | 1600 | 1550 | 1600 | 1600 |
| | Expansion ratio | | 5.5 | 5.5 | 5.6 | 5.6 | 6.2 | 2.9 | 2.4 |
| | Surface property | | A | A | A | A | A | B | B |

TABLE 4

| Example No. | | | 18 | 19 | 20 | 21 | 22 | 22a | Comp. Ex. 9 | Comp. Ex. 10 |
|---|---|---|---|---|---|---|---|---|---|---|
| Polymer sample No. | | | (26) | (27) | (28) | (29) | (30) | (30a) | (31) | (32) |
| Composition (parts) | Monomer mixture (a) | MMA | 68 | 68 | 68 | 68 | 68 | 85 | 68 | 68 |
| | | BA | 12 | 12 | 12 | 12 | 12 | 15 | 12 | 12 |
| | Monomer mixture (b) | MMA | 6 | 6 | 6 | 6 | 6 | — | 6 | 6 |
| | | BA | 14 | 14 | 14 | 14 | 14 | — | 14 | 14 |
| | Initiator amount (parts) | | 0.02 | 0.01 | 0.003 | 0.001 | 0.0005 | 0.007 | 0.1 | 0.0001 |
| | Emulsifier amount (parts) | | 0.5 | 0.7 | 0.7 | 0.7 | 0.7 | 0.7 | 0.5 | 0.7 |
| Evaluation results | Specific viscosity of core polymer | | 0.95 | 1.01 | 1.19 | 1.36 | 0.68 | 0.80 | 0.58 | 1.92 |
| | Specific viscosity of core/shell polymer mixture | | 0.65 | 0.77 | 0.95 | 1.16 | 0.49 | 0.80 | 0.27 | 1.75 |
| | Average particle diameter of latex (Å) | | 1550 | 1500 | 1650 | 1650 | 1600 | 1550 | 1600 | 1600 |
| | Expansion ratio | | 4.6 | 5.5 | 5.6 | 8.1 | 5.2 | 8.0 | 2.8 | 2.9 |
| | Surface property | | A | A | A | B | B | A | B | B |

The results given in Table 4 show the following. The polymer samples (26) to (30) and (30a), which had a specific viscosity within the range specified in the invention, gave compositions having satisfactory expansibility. In contrast, the polymer samples (31) and (32), which had a specific viscosity lower than the lower limit specified in the invention or higher than the higher limit specified in the invention, gave compositions having insufficient expansibility.

Examples 23 and 24 and Comparative Examples 11 to 14

The effect of changes in the amount of the polymer sample (28) in Example 20 incorporated into a polyester resin on expansibility was evaluated in the following manner. Moldings were obtained in the same manner as in Example 20, except that the amount of the polymer sample (28), which was used in Example 20, to be incorporated into 100 parts of the polyester resin was changed from 10 parts to 15 parts or 25 parts as shown in Table 5. The moldings obtained were examined for expansibility and surface properties. The results obtained are shown in Table 5 in comparison with Example 20, in which the polymer sample amount was 10 parts. In Comparative Example 12, the resin composition could not be sufficiently kneaded and, hence, a molding suitable for expansibility evaluation could not be obtained therefrom.

TABLE 5

| Example No. | | 20 | 23 | 24 | Comparative Example 11 | Comparative Example 12 | Comparative Example 13 | Comparative Example 14 |
|---|---|---|---|---|---|---|---|---|
| Polymer sample No. | | (28) | (28) | (28) | (28) | (28) | — | — |
| Polymer sample amount (parts) | | 10 | 15 | 25 | 0.3 | 40 | — | — |
| Pyromellitic dianhydride amount (parts) | | — | — | — | — | — | 0.4 | 0.8 |
| Evaluation results | Expansion ratio | 5.6 | 6.2 | 7.2 | 2.1 | — | 2.2 | 2.1 |
| | Surface property | A | A | A | D | D | B | B |

The results given in Table 5 show the following. The compositions containing the polymer sample (28) in an amount within the range specified in the invention showed satisfactory expansibility. In contrast, the composition of Comparative Example 11, which contained the polymer sample in an amount smaller than the lower limit specified in the invention, and the compositions of Comparative Examples 13 and 14, which contained pyromellitic dianhydride, did not show sufficient expansibility.

Examples 25 to 31 and Reference Examples 1 and 2

Moldings were obtained in the same manner as in Example 20, except that the kind and amount of the blowing agent were changed as shown in Table 6. The moldings were evaluated for expansibility and surface properties. The results obtained are shown in Table 6.

In the table, SBC indicates sodium hydrogen carbonate and ADCA indicates azodicarbonamide.

TABLE 6

| Example No. | 25 | 26 | 27 | 28 | 20 | 29 | 30 | 31 | REF. EX. 1 | REF. EX. 2 |
|---|---|---|---|---|---|---|---|---|---|---|
| Polymer sample No. | (28) | (28) | (28) | (28) | (28) | (28) | (28) | (28) | (28) | (28) |
| Polymer sample amount (parts) | 5 | 5 | 5 | 10 | 10 | 20 | 20 | 20 | 5 | 20 |
| SBC amount (parts) | 1.5 | 1.3 | 2.7 | 1.8 | 5.4 | 5.4 | 7.2 | 10.8 | 0.05 | 27 |
| ADCA amount (parts) | 0 | 0.2 | 0.3 | 0.2 | 0.6 | 0.6 | 0.8 | 1.2 | 0 | 0 |
| Evaluation results — Expansion ratio | 3.1 | 3.4 | 4.4 | 3.9 | 5.6 | 7.2 | 11.1 | 3.8 | 2.2 | 1.6 |
| Surface property | A | A | A | A | A | A | A | B | B | D |

The results given in Table 6 show that the compositions according to the invention had satisfactory expansibility.

Examples 32 to 37 and Comparative Examples 15 and 16

Moldings were obtained in the same manner as in Example 20, except that the kind and amount of the filler were changed as shown in Table 7. The moldings were evaluated for expansibility, surface properties, compressive strength, flexural strength, and HDT. The results obtained are shown in Table 7.

The fillers used and shown in the table were the following commercial products.
Talc: LMS-200, manufactured by Fuji Talc Industry Co., Ltd.
Mica: A-21, manufactured by Yamaguchi Unmo
Montmorillonite: CLOISITE-25A, manufactured by Southern Clay On the other hand, the composition of Comparative Example 16, which contained a filler in an amount larger than the upper limit specified in the invention, gave a molding in which cells had broken considerably. Thus, a molding suitable for the evaluations could not be obtained therefrom.

INDUSTRIAL APPLICABILITY

As described above, the foamable polyester resin composition of the invention comprises a polyester resin, a specific (meth)acrylic ester polymer, a filler, and a blowing agent. Because of this constitution, the composition gives a foamed molding which has an expansion ratio as high as about from 3 to 15 and in which the deterioration of surface properties and strength attributable to an increase in expansion ratio has been mitigated. Therefore, the composition of the invention can not only be molded with existing extrusion-molding machines to thereby attain a reduction in production cost, but also be used in a wider range of applications.

TABLE 7

| Sample No. | 20 | 32 | 33 | 34 | 35 | 36 | 37 | Comparative Ex. 15 | Comparative Ex. 16 |
|---|---|---|---|---|---|---|---|---|---|
| Kind of filler | talc | talc | talc | mica | montmorillonite | wollastonite | calcium carbonate | talc | talc |
| Filler amount (parts) | 1 | 3 | 15 | 3 | 3 | 3 | 3 | 0 | 35 |
| Evaluation results — Expansion ratio | 5.6 | 5.0 | 5.4 | 5.6 | 5.2 | 5.4 | 5.4 | 2.1 | 3.2 |
| Surface property | A | A | A | A | A | A | A | D | D |
| Compressive strength (MPa) | 3.3 | 3.8 | 4.1 | 2.6 | 4.1 | 4.0 | 2.2 | — | — |
| Flexural strength (MPa) | 7.8 | 9.1 | 9.5 | 8.5 | 10.1 | 9.5 | 6.7 | — | — |
| HDT (° C.) | 45 | 50 | 52 | 50 | 53 | 51 | 42 | — | — |

The results given in Table 7 show the following. The compositions respectively containing various fillers in an amount within the range specified in the invention were satisfactory in expansibility, surface properties, compressive strength, flexural strength, and HDT. In contrast, the composition of Comparative Example 15, which contained a filler in an amount smaller than the lower limit specified in the invention, gave a molding which had poor cell uniformity and hence had exceedingly poor surface properties. Thus, a molding suitable for the evaluations could not be obtained from the composition of Comparative Example 15.

What is claimed is:
1. A foamable polyester resin composition comprising:

(A) 100 parts by weight of a polyester resin;

(B) from 0.5 to 30 parts by weight of a (meth)acrylic ester polymer or a polymer mixture obtained by polymerizing (i) from 5 to 40 parts by weight of a second monomer mixture comprising (a) from 0 to 49% by weight methyl methacrylate, (b) from 51 to 100% by weight of at least one monomer selected from methacrylic esters other than methyl methacrylate and acrylic esters, and (c) from 0 to 20% by weight of at least one vinyl monomer copolymerizable therewith, in the presence of a polymer latex which is obtained by emulsion-polymerizing (ii) from 60 to 95 parts by weight of a first monomer mixture comprising (a) from 51 to 100% by weight methyl methacrylate, (b) from 0 to 49% by weight at least one monomer selected from methacrylic esters other than methyl methacrylate and acrylic esters, and (c) from 0 to 20% by weight of at least one vinyl monomer copolymerizable therewith wherein when 0.1 g of said polymer latex is dissolved in 100 mL of chloroform, the resulting solution has a specific viscosity of from 0.7 to 1.9 as measured at 30° C., and wherein, when 0.1 g of the (meth)acrylic ester polymer or the polymer mixture is dissolved in 100 mL of chloroform, the resulting solution has a specific viscosity of from 0.65 to 1.7 as measured at 30° C., and wherein the sum of the first and second monomer mixtures is 100 parts by weight;

(C) from 0.1 to 30 parts by weight of a filler; and (D) a blowing agent.

2. The foamable polyester resin composition according to claim 1, wherein the polyester resin (A) is an amorphous polyester resin.

3. The foamable polyester resin composition according to claim 1 or 2, wherein the filler (C) is talc, calcium carbonate, mica, wollastonite, clay, or glass fiber.

4. The foamable polyester resin composition according to claim 1, wherein the blowing agent (D) is a thermal-decomposable blowing agent and is contained in an amount of from 0.1 to 25 parts by weight per 100 parts by weight the polyester resin.

5. The foamable polyester resin composition according to claim 2, wherein the blowing agent (D) is a thermal-decomposable blowing agent and is contained in an amount of from 0.1 to 25 parts by weight per 100 parts by weight the polyester resin.

6. The foamable polyester resin composition according to claim 3, wherein the blowing agent (D) is a thermal-decomposable blowing agent and is contained in an amount of from 0.1 to 25 parts by weight per 100 parts by weight the polyester resin.

7. A foamed molding obtained by molding the foamable polyester resin composition according to claim 1.

* * * * *

UNITED STATES PATENT AND TRADEMARK OFFICE
CERTIFICATE OF CORRECTION

PATENT NO.        : 6,812,264 B2                                   Page 1 of 1
APPLICATION NO.   : 10/380390
DATED             : November 2, 2004
INVENTOR(S)       : Takenobu Sunagawa et al.

It is certified that error appears in the above-identified patent and that said Letters Patent is hereby corrected as shown below:

On the Title Page

In column 2, line 10, under "ABSTRACT", after "measured at 30°", delete "C." and substitute --C-- in its place; line 15, before "(C) from" delete "C.," and substitute --C,-- in its place.

In the Claims

Columns 16-17, in claim 1, line 26, after "measured at 30°" delete "C.," and substitute --C,-- in its place; line 30, after "measured at 30°" delete "C.," and substitute --C,-- in its place.

Signed and Sealed this

Sixteenth Day of October, 2007

JON W. DUDAS
*Director of the United States Patent and Trademark Office*